July 24, 1928.
K. G. MAGNI
1,678,402
AUDIBLE SPEED INDICATOR
Filed Feb. 18, 1927
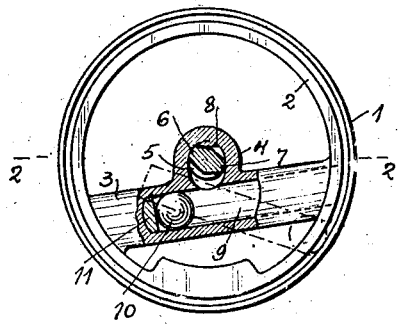
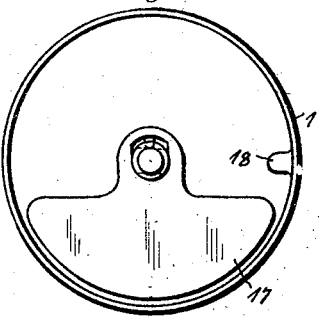
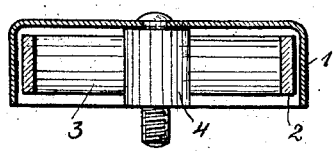
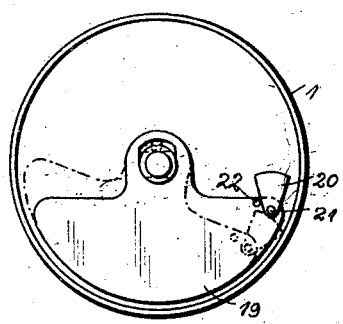
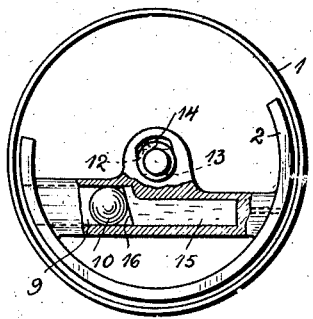
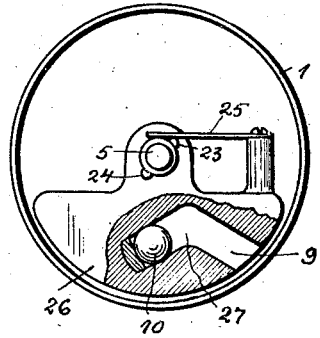
K. G. Magni INVENTOR
By: Marks & Clark
ATTYS.

Patented July 24, 1928.

1,678,402

UNITED STATES PATENT OFFICE.

KARL GUNNAR MAGNI, OF LINKOPING, SWEDEN, ASSIGNOR TO AKTIEBOLAGET BALTIC, OF STOCKHOLM, SWEDEN.

AUDIBLE SPEED INDICATOR.

Application filed February 18, 1927, Serial No. 169,391, and in Sweden February 22, 1926.

This invention relates to a device which by means of acoustic signals indicate, that the velocity of a machine or the like has been reduced to an amount below a certain limit. According to the idea of the invention the said device may be so arranged, that it indicates also an upper limit of the velocity.

The said device comprises a sound emitting member, a pendulum and a member imparting impulses to the said pendulum, so that the latter oscillates. According to the invention said pendulum and the member imparting impulses to the same are mounted on the same carrier or the same shaft the velocity of which is to be indicated. The said pendulum is so balanced, that the number of its natural oscillations is within the velocity limits, between which the indicator should sound. If for instance the indicator should begin to sound, when the velocity has been reduced to 60 revolutions per minute, the number of natural oscillations of the indicator may be 55 per minute or a multiple thereof. The indicator is then able to emit sound between 60 and 50 revolutions. In addition to the said members the indicator may also comprise one or more members by means of which the said pendulum actuates the sound emitting member, when the amplitude of the oscillations has reached a certain amount. The said additional member or members may also be adapted to moderate the oscillations of the pendulum. Through the said moderation pulsations of the oscillating movement may be prevented, whereby the limits, at which the indicator sounds, become more fixed.

Some forms of execution of the invention are shown as examples in the accompanying drawing. Fig. 1 is a front view, partially a section, of an indicator arranged in accordance with the invention, and Fig. 2 is a section on the line 2 to 2 of Fig. 1. Fig. 3 shows in a front view partially in section a speed indicator according to a second form of the invention. Figs. 4 and 5 show in front views two other forms of the invention. Fig. 6 is a front view partially a section of a further form of execution.

1, Figs. 1 and 2, is a bell. In the said bell a pendulum is provided, comprising a ring-shaped part 2, a tubular transversal part 3 and a hub 4 provided on the said part 3. By means of the hub 4 said pendulum is suspended on a shaft 5, provided with two cam surfaces 6 and 7. Hub 4 has an inner substantially plane surface 8, co-operating with the said cam surfaces. In the tubular cross piece 3 a race 9 is provided for a ball 10. One of the ends of the race is open. In the opposite closed end of the cross piece a member 11 of felt or the like is provided acting as a buffer for the ball in order to prevent the creation of extraneous noises. The pendulum is suspended on the shaft in such manner, that it is prevented from oscillating horizontally. Bell 1 may be arranged to rotate with the shaft 5.

The speed indicator operates in the following manner. As the shaft 5 rotates, the cam surfaces 6 and 7 slide along the surface 8 of the hub 4, so that the point of suspension of the pendulum is moved rhythmically. The impulses thereby imparted to the pendulum cause the same to oscillate. As long as the pendulum is at rest or the oscillations are slight, the ball race 9 inclines inwards and the ball 10 occupies a certain position shown by full lines in Fig. 1. As, on the other hand, the frequency of the impulses becomes substantially equal to the natural oscillations of the pendulum, the amplitude is increased considerably, which results in the ball 10 rolling outwards toward the bell 1 and in the indicator beginning to emit sound, see the dotted lines in Fig. 1. When the frequency of the impulses has remained an amount sufficiently greater than the natural oscillations of the pendulum, the indicator ceases emitting sound.

In the form of execution shown in Fig. 3 cam surfaces 12 and 13 of the shaft 5 act upon a projection 14 in the hub 4 of the pendulum 2, consisting of a ring segment. Also in this case the position of the suspension point of the pendulum is changed and impulses thereby imparted to the pendulum substantially in the same manner as in Fig. 1. The speed indicator operates as described above. The buffer 15 of felt or the like provided in the race 9 for the ball 10 has a surface 16 extending upwards in an oblique direction. The ball 10 strikes at its return stroke the said surface and is thereby prevented from bounding and striking the upper side of the race, which otherwise would produce an extraneous noise.

Fig. 4 shows a pendulum 17 which is caused to oscillate by a device of substantially the same construction as that shown in Fig. 3. The bell 1, which in this case is stationary, has an inner projection 18. When the amplitude of the oscillations of the pendulum has the necessary amount, the pendulum strikes the said projection 18 and a sound is emitted.

According to the form of execution shown in Fig. 5 pendulum 19, which is acted upon in the same manner as the pendulums shown in Figs. 3 and 4, is provided with a hammer 20, pivoted at 21. At a sufficient amplitude of the oscillations of the pendulum said hammer will occupy alternately the position shown by full lines and determined by a pin 22 fixed in the pendulum, and the position shown by dotted lines, in which the hammer strikes the bell 1, a sound being thus emitted.

In the form of execution shown in Fig. 6 shaft 5 has two cam shaped projections 23 and 24 which act upon a blade spring 25, fixed to the pendulum 26, swingable on the shaft 5. Also in this form of execution said pedulum is caused to oscillate and as the amplitude of the oscillations has a certain amount ball 10 will pass the bend 27 of the race 9 provided in the pendulum and then roll down the outer portion of the said race and strike the bell 1. Owing to this arrangement the limits between which the indicator emits sound are more distinctly fixed and the ball will always effect a sufficiently heavy blow.

The function of the indicator may be modified in such manner, that it emits sound at all velocities from for instance 60 revolutions to a slight velocity for instance nil. The fact is that the amplitude increases more or less also at frequencies of impulses equal to 1/2, 1/3, 2/3 and so on of the number of the natural oscillations, and the indicator may be arranged to emit sound also then, in which case the ranges in which the indicator emit sound may be brought to run into one another. The cam surfaces or projection mentioned above may be arranged to statically incline the ball race in such degree, that at a slow oscillation of the pendulum the ball rolls outwards.

I claim:

1. A speed indicator provided with a sound emitting member, a rotary member, and a pendulum actuated by impulses dependent upon the rotation of said rotary members the number of revolutions of which is to be indicated, said pendulum being swingably suspended on the member which imparts impulses to the same, and means acted upon by the pendulum to cause the sound emitting member to give an audible signal at a predetermined oscillation of the pendulum.

2. In a speed indicator as claimed in claim 1, a plurality of operating cam surfaces on said rotary member, said cam surfaces cooperating in such manner with the pendulum that the point of suspension of the pendulum is moved relatively to the centre of gravity of the said pendulum, and means acted upon by the pendulum to cause the sound emitting member to give an audible signal at a predetermined oscillation of the pendulum.

3. In a speed indicator as stated in claim 1, a plurality of operating cam surfaces on said rotary member, said cam surfaces cooperating with a suspension surface on the pendulum, and means acted upon by the pendulum to cause the sound emitting member to give an audible signal, said cam surfaces and suspension surface being so arranged and the suspension surface so located with relation to centre of gravity of the pendulum that the indicator emits an audible signal while the shaft is rotating at a predetermined speed.

4. In a speed indicator as stated in claim 1, said pendulum being combined with means movable relatively to the said pendulum and adapted to strike said sound emitting member at a predetermined oscillation of said pendulum.

5. In a speed indicator as stated in claim 1, said pendulum being provided with a race for a rolling member which at sufficiently great strokes of the pendulum moves outward towards one of the ends of said race and strikes the sound emitting member at a predetermined oscillation of the pendulum.

6. In a speed indicator as stated in claim 1, said pendulum being provided with a race for a rolling member so that the rolling member moves outwards towards one of the ends of the said race and strikes the sound emitting member at a predetermined oscillation of said pendulum, said race being provided with a member of felt or the like acting as a buffer for the rolling member at its return stroke.

7. In a speed indicator as stated in claim 1, said pendulum being provided with a race for a rolling member so that the rolling member moves outwards towards one of the ends of the said race at a predetermined oscillation of said pendulum and strikes said sound emitting member, said race being provided with a member of felt or the like acting as a buffer for the rolling member at its return stroke, said member having an oblique projecting surface, which the rolling member strikes and thus is prevented from bounding.

In testimony whereof I have hereunto affixed my signature.

KARL GUNNAR MAGNI.